Patented Sept. 30, 1930

1,776,971

UNITED STATES PATENT OFFICE

ANTHONY JAMES HAILWOOD, OF BLACKLEY, MANCHESTER, ENGLAND, ASSIGNOR TO BRITISH DYESTUFFS CORPORATION LIMITED, OF MANCHESTER, ENGLAND

PROCESS OF SOLUBILIZING A PERYLENETETRACARBOXYLIC DI-IMIDE DYESTUFF AND DYESTUFFS PRODUCED THEREBY

No Drawing. Application filed July 25, 1927, Serial No. 208,417, and in Great Britain August 19, 1926.

The present invention relates to improving the vatting properties of the dyestuffs prepared by the processes of the British patent specification No. 26,690 of 1913. These vat dyestuffs will be referred to in this specification as perylenetetracarboxylic di-imide dyestuffs and they have the probable characteristic formula:

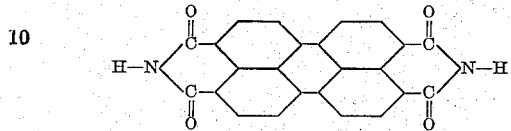

The above mentioned dyestuffs have somewhat inferior vatting properties due to the insolubility of the leuco compound in the vat. The vat obtained with these dyestuffs is sensitive to alkaline hydrosulphite and the leuco compound comes out at once in flocks. For instance, the claret colored dyestuff prepared from naphthalimide by fusing with caustic alkali at from 280° C. to 300° C. is a water-insoluble powder or paste. It gives a sparingly alkali soluble leuco derivative and the sparing solubility of the same limits its application in dyeing. Attempts have been made to improve the vatting properties of these dyestuffs but they have all met with failure.

I have now found new processes for converting these dyestuffs into an improved form. The improved dyestuffs are soluble or colloidally soluble and are suitable for vatting. They disperse readily in water or weak alkali and give on vatting in the usual manner a highly dispersed vat of considerable stability, from which dyeings may be more readily and satisfactorily obtained than is possible by the use of the original dyestuffs.

The new process consists in treating the dry powdered dyestuff with sulphonating agents other than ordinary concentrated sulphuric acid, for example with oleum, or particularly with chlorosulphonic acid, at moderate temperatures, and after some time pouring the mixture on to water or ice. The precipitate is then filtered off, washed with a little water and the small residual acidity of the paste neutralized by caustic soda. The product is then either dried or stored as a paste. The product either dry or as a paste on mixing with a large quantity of warm water disperses through it, and on vatting this dispersion in the usual manner, a vat of superior qualities is obtained, from which claret shades on cotton are obtained of unimpaired fastness. The superiority of the vat obtained from the dispersed dyestuff is exhibited mainly in its greater dispersion-stability and more level dyeing and penetrating properties.

The following examples illustrate my new process. The particular details however may be varied in a considerable degree and the examples do not limit the method of carrying out my invention. The parts are by weight. 5 parts of perylenetetracarboxylic di-imide, such as may be obtained by fusing naphthalene 1:8 dicarboxylic acid imide with caustic potash (see Example 1 of the British patent specification No. 26,690/13) are charged into 28 parts of 20 per cent oleum and the temperature raised to 50° C. for 1 hour. The product is then cooled and poured on to a mixture of 100 parts of ice and 50 parts of water, and the precipitate filtered off. This is washed with a little water and then made slightly alkaline with caustic soda.

10 parts of perylenetetracarboxylic di-imide, such as may be obtained by fusing naphthalene 1:8 dicarboxylic acid imide with caustic potash (see Example 1 of the British patent specification No. 26,690/13) are charged into 50 parts of chlorosulphonic acid below 20° C. The temperature is then raised during 1 hour to 50° C. and maintained at this temperature for 1 hour. Hydrochloric acid gas is evolved during this process. The product is then cooled and poured into a mixture of 200 parts of ice and 100 parts of water. The precipitate is filtered off, washed with a little water and the remaining paste made slightly alkaline with caustic soda and then represents the desired product.

The following example illustrates a method of using the new product in dyeing.

2 parts of the dyestuff powder or an equivalent amount of paste, as prepared in Example 1 or 2, are stirred into 1250–1500 parts of water at 50°–60° C., and 15 parts of caustic soda solution 76° Twad., are added followed by 4 parts of sodium hydrosulphite. The reduction is almost immediate. 100 parts of the cotton are worked in this vat for ½–¾ hour, then rinsed in cold water and allowed to oxidize in the air. The cotton is then soaped in a boiling soap bath, rinsed in warm water and dried.

What I claim and desire to secure by Letters Patent is:—

1. The process of converting a perylenetetracarboxylic di-imide dyestuff into a soluble or colloidally soluble form suitable for vatting, which comprises a treatment of the said dyestuff with chlorosulphonic acid, followed by reprecipitation of the dyestuff by dilution.

2. The process of converting a perylenetetracarboxylic di-imide dyestuff into a soluble or colloidally soluble form suitable for vatting, which comprises a treatment of the said dyestuff with a sulphonating agent of the class consisting of oleum and chlorosulphonic acid, followed by reprecipitation of the dyestuff by dilution.

3. The process of converting a perylenetetracarboxylic di-imide dyestuff into a soluble or colloidally soluble form suitable for vatting, which comprises a treatment of the said dyestuff with oleum, followed by reprecipitation of the dyestuff by dilution.

4. The improved form of a perylenetetracarboxylic di-imide dyestuff existing in a soluble or colloidally soluble condition suitable for vatting and obtainable by treating an ordinary perylenetetracarboxylic di-imide dyestuff with a sulphonating agent of the class consisting of oleum and chlorosulphonic acid, followed by reprecipitation by dilution, said dyestuff in its improved form having the chemical properties of the original dyestuff but characterized by the fact that it yields with alkaline hydrosulphite a clear vat of considerable stability when protected from oxidation.

In testimony whereof I affix my signature.

ANTHONY JAMES HAILWOOD.